United States Patent [19]
Natali

[11] Patent Number: 5,654,955
[45] Date of Patent: Aug. 5, 1997

[54] NETWORK ENTRY CHANNEL FOR CDMA SYSTEMS

[75] Inventor: Francis D. Natali, Pt. Townsend, Wash.

[73] Assignee: Stanford Telecommunications, Inc., Sunnyvale, Calif.

[21] Appl. No.: 358,078

[22] Filed: Dec. 15, 1994

[51] Int. Cl.$^6$ .................................. H04B 7/216
[52] U.S. Cl. .................... 370/320; 375/208; 370/324; 370/209
[58] Field of Search .................... 370/18, 19, 20, 370/21, 22, 95.3, 95.1, 100.1, 104.1, 105.3, 110.1, 105.2; 375/205, 208, 206, 358; 455/12.1

[56] References Cited

U.S. PATENT DOCUMENTS

| | | | |
|---|---|---|---|
| 4,616,108 | 10/1986 | Yamaguchi et al. | 379/63 |
| 4,748,622 | 5/1988 | Muratani et al. | 370/104.1 |
| 5,036,523 | 7/1991 | Briskman | 375/206 |
| 5,103,459 | 4/1992 | Gilhousen et al. | 370/22 |
| 5,177,767 | 1/1993 | Kato | 375/206 |
| 5,345,469 | 9/1994 | Fulghum | 375/206 |
| 5,353,300 | 10/1994 | Lee et al. | 370/18 |
| 5,359,624 | 10/1994 | Lee et al. | 375/205 |
| 5,367,536 | 11/1994 | Tsujimoto | 370/111 |

OTHER PUBLICATIONS

Francis Natall et al, "Spread Spectrum Technology for Commercial Applications", Proceedings of IEEE, Jun. 1994.

*Primary Examiner*—Alpus H. Hsu
*Assistant Examiner*—Seema S. Rao
*Attorney, Agent, or Firm*—Jim Zegeer, Esq.

[57] ABSTRACT

An OCDMA satellite communication system in which an earth-based hub station receives, via a satellite, a plurality of spread spectrum signals from a corresponding plurality of earth-based subscriber stations on a selected frequency channel, each signal from a subscriber station being composed of data symbols overlaid with one set of orthogonal Rademacher-Walsh (RW) functions and a pseudo-noise PN sequence, the signals from subscriber stations being synchronized to arrive at the hub station in time and frequency synchronism. A subscriber station net entry channel (NEC) is comprised of a transmitter function at the subscriber stations for transmitting a spread spectrum NEC signal located in a spectral null of the OCDMA signals between the earth-based hub station and the subscriber stations. Receiver functions at the earth-based hub station detect and demodulate the NEC signal and assign a frequency and RW function to the user, and transmits frequency and time correction signals to the user to assure that the user is near time synchronism upon net entry.

3 Claims, 3 Drawing Sheets

NETWORK ENTRY CHANNEL FOR CDMA SYSTEMS

BACKGROUND AND BRIEF DESCRIPTION OF THE PRIOR ART

Spread spectrum communications is presently being used for a number of commercial applications and is expected to proliferate as the demand for untethered communications increases.

For example, an orthogonal CDMA (OCDMA) system is discussed for an office PBX system by Magill et al. in "Spread-Spectrum Technology for Commercial Applications", Proc. of the IEEE, June 1994 (incorporated herein by reference). In this case, the base station of this star-configured network transmits a set of orthogonal Rademacher-Walsh (RW) functions which are overlaid with a pseudo-noise (PN) sequence. Each orthogonal function carries voice or data for a single user. See M. J. E. Golay IDA Report 108, pg. 110 (1965) which discloses this basic signal format.

The discussion by Magill et al, is for a short range system in which it makes sense to provide TDMA time slots on the return link for network members to transmit a signal for timing and synchronization purposes. In this manner, an empty slot is reserved for a member to enter the net at any time. This technique becomes inefficient and is not useful when the path lengths are long and the propagation time varies considerably between users, such as in a satellite system.

OBJECTS OF THE INVENTION

The invention described below has the following objects:

Provide means for accessing an OCDMA network on a noninterfering basis without prior time and frequency synchronism.

Provide a system that allows the hub station to detect and synchronize the user before assigning the user an orthogonal function for OCDMA operation.

Provide the user with a high link margin, low data rate channel for net entry requests.

SUMMARY OF THE INVENTION

The embodiment as disclosed herein relates to the return link of a star configured spread spectrum satellite network shown in FIG. 1. The satellite S receives the user signals from the ground user stations 10-1, 10-2 . . . 10-N and transponds them to a hub ground station (GS). The return link signal structure described below incorporates orthogonal CDMA (OCDMA) with a separate Network Entry Channel (NEC). The advantage of the OCDMA approach is that the number of users in a given bandwidth can be increased because of the reduced access noise. Further, this technique is less sensitive to power control accuracy than a nonorthogonal CDMA system.

The hub ground station of a satellite network receives a multiplicity of spread spectrum signals. Each of these signals (on a particular frequency channel) is composed of data symbols which are overlaid with one of a set of orthogonal Rademacher-Walsh (RW) functions as well as a pseudo-noise (PN) sequence. These signals are synchronized to arrive at the hub station in time and frequency synchronism. The orthogonal properties of the signals allow them to be demodulated without access noise from co-channel signals. Nonsynchronous users on this channel cannot be demodulated by the GS due to the high level of access noise for a nonorthogonal user. According to the invention, a separate Net Entry Channel (NEC) is provided for nonsynchronous users. Spread spectrum signals on this channel can be received by the hub station free of access noise from the traffic channels. The GS can determine the necessary time and frequency corrections that the new user must employ in order to enter the OCDMA network in synchronism. This is necessary to establish user-GS communications on the traffic channel. The NEC provides a means for the user to transmit a net entry request with high link margin, due to the low data rate and low access noise. The use of a lower rate short code on the NEC (than on the traffic channels) allows rapid acquisition of the PN signal despite timing uncertainties.

DESCRIPTION OF THE DRAWINGS

The above and other objects, advantages, and features of the invention will become more apparent when considered with the following specification and accompanying drawings wherein.

DETAILED DESCRIPTION OF THE INVENTION

Signal Structure

The fundamental purpose of the return link is to transmit data from the user to the GS. The data transmission rate will be taken to be 5200 bps for illustrative purposes. The data is further assumed to be rate ½ encoded. The data modulation is QPSK so that the channel symbol rate is then 5200 sps.

Figure 1:
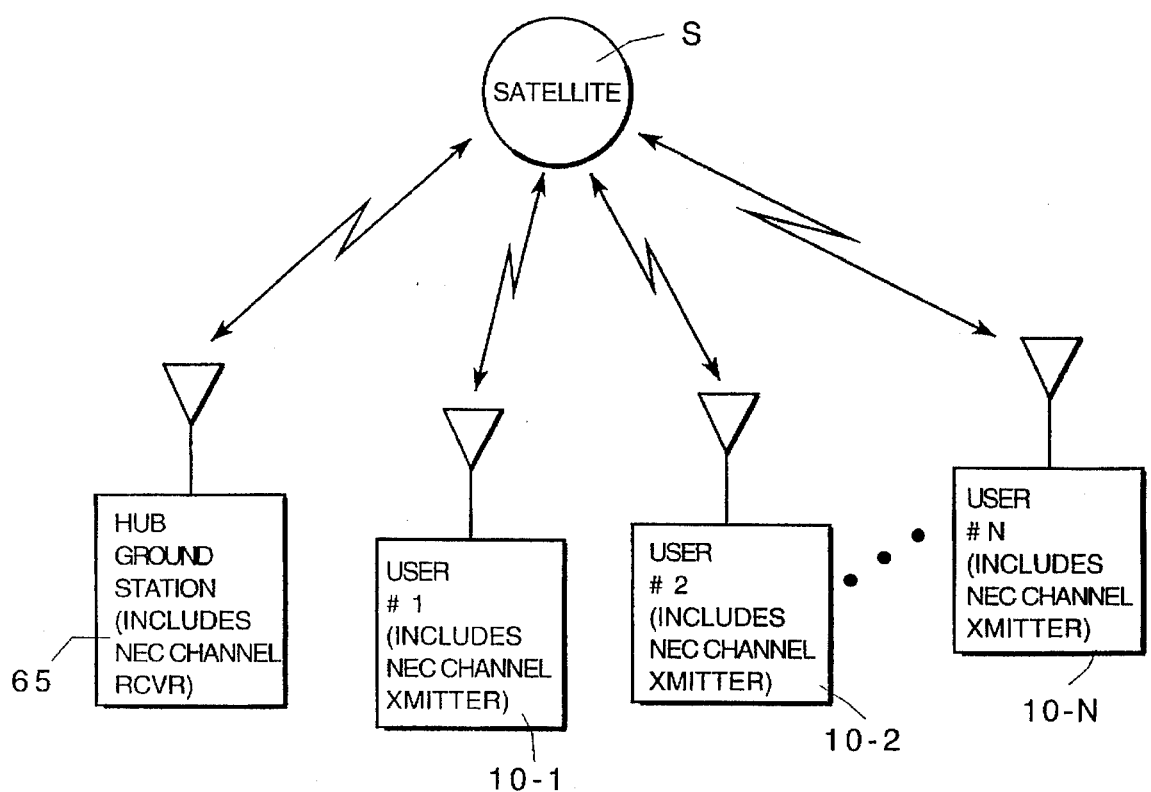
FIG. 1 is a diagram of a star configured spread spectrum satellite communication network.
Figure 2:
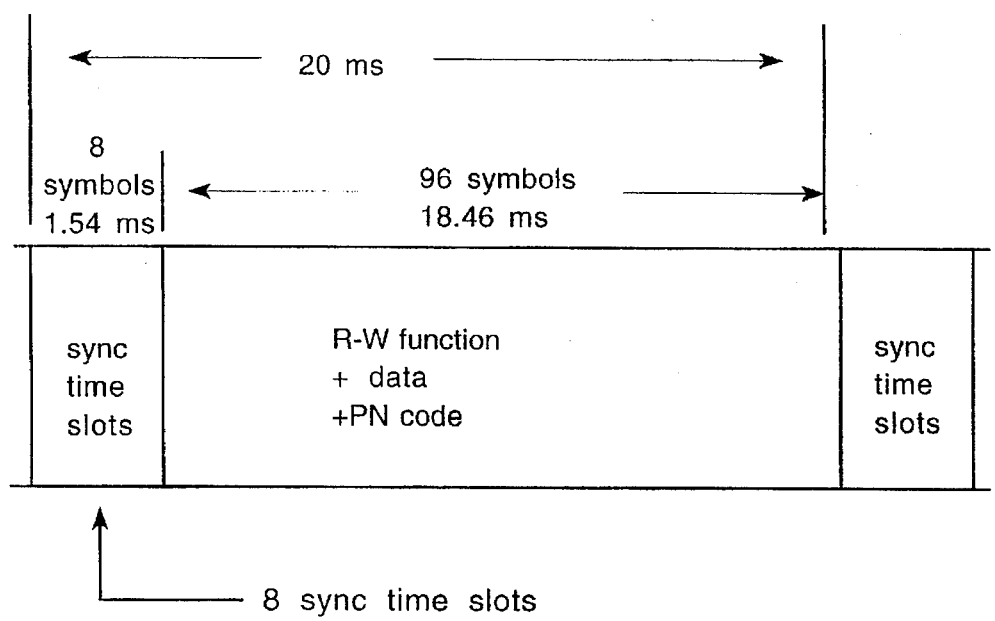
FIG. 2 is a diagram of the time framing of the return link signal.

One of 32 Rademacher-Walsh functions is assigned to the return link transmission. This waveform is time synchronous with the data Symbols but is clocked at 32 times the symbol rate (166.40 kHz), i.e. the R-W period is equal to one symbol period. The signal is further covered with a PN code which is time synchronous with the R-W function but is clocked at four times the rate (665.60 kHz). The code is a Gold code of length 1023 (approximately 8 symbols long). The signal is organized into 20 ms frames as shown in FIG. 2. The main portion of the frame consists of 96 data symbols which are transmitted as described above. This is followed by a time interval of eight symbol lengths which is used for acquisition and synchronization purposes. During this interval, each of the 32 users on a particular carrier frequency transmits one sync burst (one symbol length) every four frames. That is, there are 8 sync slots of one symbol in length available in a frame, and 32 such slots in 4 frames. Each of these slots is assigned to one of the 32 potential users for sync purposes. The sync burst consists of a 128 chip PN code transmitted at 665.60 kHz clock rate using BPSK modulation. This results in 12.5 updates per second, which is adequate for code and frequency tracking loops with bandwidths up to about 3 Hz.

Net Entry Channel

Return link OCDMA operation requires that all users arrive at the ground station in time and frequency synchronism, therefore a separate channel is provided for net entry and initial synchronization. It should be noted that a nonsynchronous user (with power equal to the other users) attempting to enter the net oh the OCDMA frequency could not be acquired by the ground station due to access noise if the system were near full loading. This is because a considerably greater number of links can be supported on a single frequency for an OCDMA system compared to a conventional CDMA system, since the signals are orthogonal when averaged over a Racemacher-Walsh function period. Likewise, the access noise is equivalently greater when not in synchronism and would prevent acquisition of nonsynchronous signal in a reasonable amount of time.

Figure 3A:
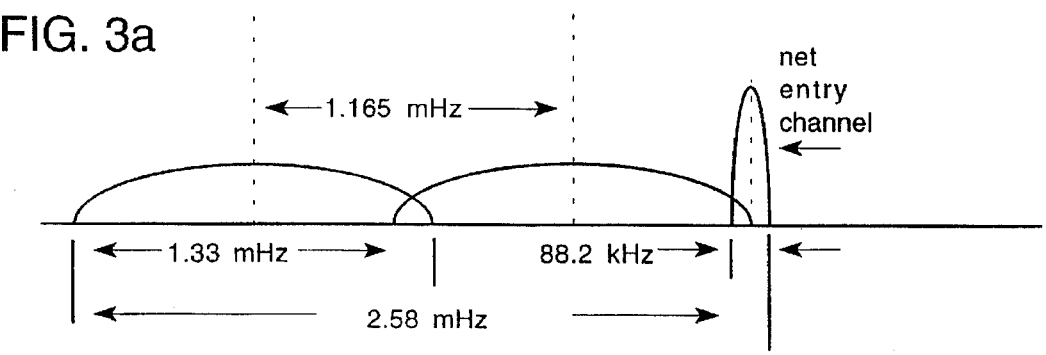
FIG. 3a illustrates spread signal spectrums.
Figure 3B:
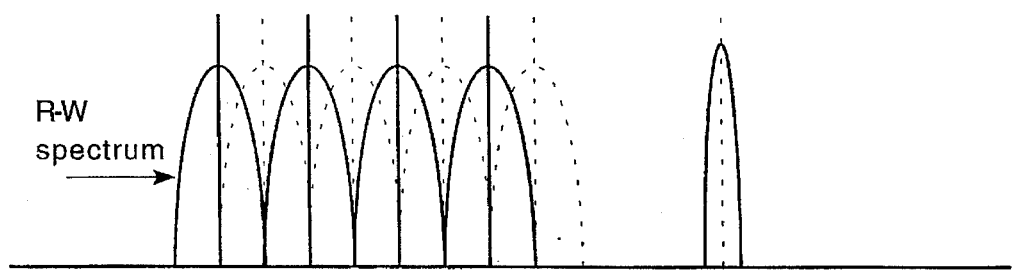
FIG. 3b illustrates the spectrum after despreading PN code, with all frequencies occupied.

If the user wishes to make or answer a call, the first transmission is on the net entry channel (NEC) which is located in a spectral null of the OCDMA signal as shown in FIGS. 3a and 3b. The NEC transmission is spread spectrum with a 512 bit PN code clocked at 41.60 kHz (665.50 kHz +16) and biphase modulated on the carrier. The PN code period is about 12.3 ms. All users attempting net entry use the same PN code. Thus users having a relative differential delay of less than one chip ($\approx$24 μs) could interfere with each other. Each user, however, picks a random transmit time delay or advance from −100 to +100 chips, in order to ensure a relatively uniform spread in delays and thus a minimum number of "collisions."

Data is added mod(2) to the PN code at a rate of two data bits per code period giving a data rate of 162.5 bps. The data that is transmitted includes user identification and the random time offset number.

Signal Spectrum

The return link signals are grouped 32 users to a frequency, with frequencies spaced by the R-W clock rate which is 166.4 kHz as shown in FIG. 3b. Eight of these frequencies are assigned. The overall channel occupancy is as shown in FIG. 3a. The channel bandwidth is shown as 2.58 mHz. Note that this frequency plan of this embodiment can accommodate 248 users plus 8 control channels as well as a net entry channel.

Return Link Signal Acquisition

The user NEC signal is received at the GS with some initial time and frequency uncertainty. The received C/No is nominally about 42 dB-Hz based on an Eb/No =5 dB at 5200 bps.

Assume that the ground station receiver is searching the NEC in one half chip increments. At each code phase position, the frequency uncertainty is examined for signal energy. For the moment, assume that this is done with an FFT. The power in each of the FFT bins is examined for signal presence. Once the signal is detected, the delay lock (DLL) and automatic frequency control (AFC) loops can be enabled and data demodulation started.

Once the NEC has been acquired and demodulated, the GS can assign an appropriate frequency and R-W function to the user for call connection. The GS further transmits a frequency and time correction to the user so that the user is near time synchronism upon net entry. In order to better understand this process, assume that GS tracks the NEC code phase to better than 5% of a chip, i.e. less than one PN chip on the traffic channel (TC), The GS commands the user to a particular frequency and assigns a R-W function. The GS also provides time and frequency correction data. When the user starts transmission on the TC, the GS code and AFC tracking loops can be enabled immediately and data demodulation begun. Further time and frequency corrections are transmitted to the user as needed.

Transmitter Implementation

Figure 4:
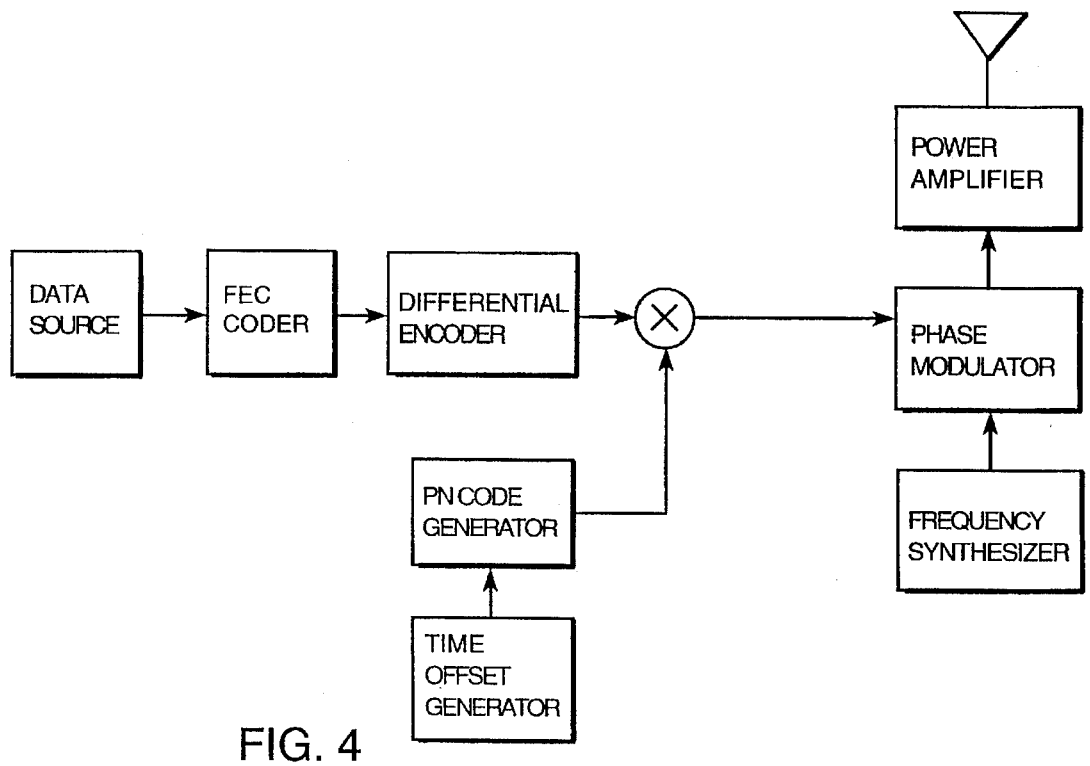
FIG. 4 is a functional block diagram of a user NEC transmitter incorporating the invention.

A functional block diagram of the signal transmitter is shown in FIG. 4. The input data is formatted, interleaved, coded, and I/O symbols formed in the usual manner. These symbols are overlaid with the PN code as well as the appropriate R-W function. Similarly, for the NEC channel signal, the user access AC data (user identification number and time offset number, etc.) is formatted and differentially encoded. This data is overlaid only with a time synchronous PN code whose period is equal to a data symbol. The two baseband signals are time multiplexed and then phase modulated onto a carrier of appropriate frequency.

Receiver Implementation

Figure 5:
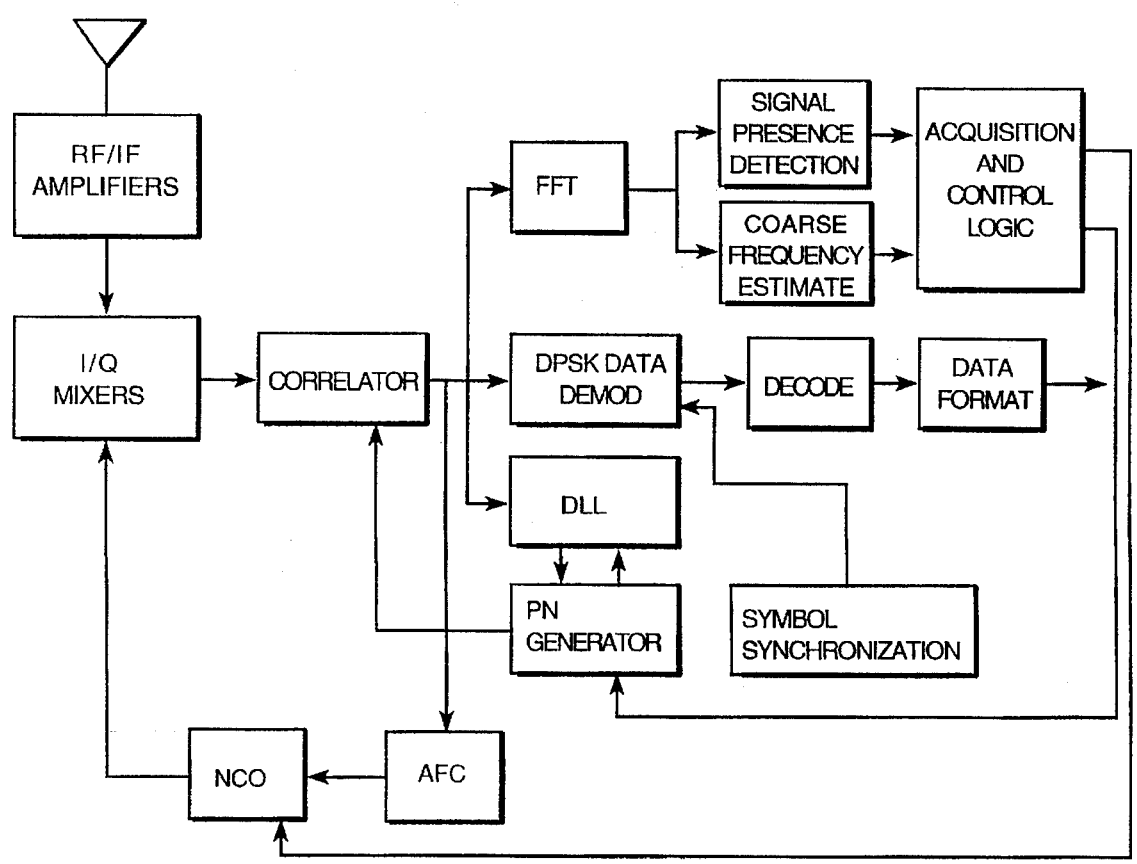
FIG. 5 is a functional block diagram of a hub NEC receiver incorporating the invention.

A functional block diagram of the user receiver is shown in FIG. 5. The received signal is amplified and down converted to baseband using in-phase (I) and quadrature (Q) mixers in a conventional fashion. The signal is then routed to a correlator for despreading. A Fourier Transform (FFT) is performed on the correlator output and the various frequency bins examined for signal presence. If the signal is detected in one of the frequency bins, then signal presence is declared and the receiver NCO tuned such that the signal frequency offset is removed. The AFC and code tracking delay-lock loop (DLL) are then enabled, and data demodulation begins.

The invention incorporates the following features:

- The hub station of a satellite network receives a multiplicity of spread spectrum signals. Each of these signals (on a particular frequency channel) is composed of data symbols which are overlaid with one of a set of orthogonal Rademacher-Walsh functions as well as a pseudo-noise (PN) sequence. These signals are synchronized to arrive at the hub station in time and frequency synchronism. The orthogonal properties of the signals allow them to be demodulated without access noise from co-channel signals. This is called orthogonal CDMA (OCDMA). Nonsynchronous users on this channel cannot be demodulated by the GS due to the high level of access noise for a nonorthogonal user. A separate Net Entry Channel (NEC) is provided for nonsynchronous users. Spread spectrum signals on this channel can be received by the hub station free of access noise from the traffic channels.

- The GS can determine the necessary time and frequency corrections that the new user must employ in order to enter the OCDMA network in synchronism. This is necessary to establish user GS communications on the traffic channel.

- The NEC provides a means for the user to transmit a net entry request with high link margin, due to the low data rate and low access noise.

- The use of a lower rate short code on the NEC (than on the traffic channels) allows rapid acquisition of the PN signal despite timing uncertainties.

While preferred embodiments of the invention have been described and illustrated, it will be appreciated that other embodiments of the invention will be readily apparent to those skilled in the art that various other embodiments, adaptations and modifications of the invention are possible.

What is claimed is:

1. In an OCDMA satellite communication system in which an earth-based hub station receives, via a satellite, a plurality of spread spectrum signals from a corresponding plurality of earth-based subscriber stations on a selected frequency channel, each signal from a subscriber station being composed of data symbols overlaid with one set of orthogonal Rademacher-Walsh (RW) functions and a pseudo-noise (PN) sequence, said signals from subscriber stations being synchronized to arrive at said hub station in time and frequency, the improvement comprising: means for forming a subscriber station net entry channel (NEC) signal comprised of means at each subscriber station for transmitting an NEC signal located in a spectral null of the OCDMA signals to said earth-based hub station, said NEC signal including a user identification number and time offset number which have been overlaid by a time synchronous PN code and in the absence of any of said RW functions, means at the earth-based hub station for detecting and demodulating said NEC signal from each subscriber station and assigning a frequency and RW function to the said each subscriber station, and means for transmitting frequency and time correction signals to said each subscriber station said each subscriber station having receiver means for receiving said frequency and time correction signals, and means to cause said each subscriber station to be near time synchronism upon net entry.

2. In an OCDMA communication system in which an earth-based hub station receives a plurality of spread spectrum signals from a corresponding plurality of earth-based subscriber stations on a selected frequency channel, each signal from a subscriber station being composed of data symbols overlaid with one set of orthogonal Rademacher-Walsh (RW) functions and a pseudo-noise (PN) sequence, said signals from subscriber stations being synchronized to arrive at said hub station in time and frequency, the improvement comprising means for forming a subscriber station for transmitting an NEC signal located in a spectral null of the OCDMA signals to said earth-based hub station, said NEC signal including a user identification number and time offset number which have been overlaid by a time synchronous PN code and in the absence of any of said RW functions, means at the earth-based hub station for detecting and demodulating said NEC signal from each subscriber station and assigning a frequency and RW function to the said each subscriber station, and means for transmitting frequency and time correction signals to said each subscriber station, said each subscriber station having receiver means for receiving said frequency and time correction signals and means to assure that said each subscriber station is near time synchronization upon net entry.

3. A method of accessing an OCDMA communication system on a non-interfering basis without prior time and frequency synchronization in which said OCDMA communication system has an earth-based hub station for receiving a plurality of spread spectrum signals from a corresponding plurality of earth-based subscriber stations on a selected frequency channel, each spread spectrum signal from a subscriber station being composed of data symbols overlaid with one set of orthogonal Rademacher-Walsh (RW) functions and a pseudo-noise (PN) sequence, said spread spectrum signals from said subscriber stations being synchronized to arrive at said hub station in time and frequency comprising each subscriber station transmitting an NEC signal located in a spectral null of the OCDMA signals to said earth-based hub station, said NEC signal including a user identification number and time offset number which have been overlaid by a time synchronous PN code and in the absence of any of said RW functions, detecting and demodulating said NEC signal from each subscriber station at said earth-based hub station and assigning a frequency and RW function to said each subscriber station, and transmitting frequency and time correction signals to said each subscriber station, said each subscriber station having a receiver for receiving said frequency and time correction signals and assure that said each subscriber station is near time synchronization upon net entry.

\* \* \* \* \*